Nov. 19, 1968  C. R. SEBENS ET AL  3,412,278
HOLLOW CATHODE HAVING A MATRIX MATERIAL WITH
PARTICLES INTERSPERSED
Filed Dec. 1, 1965
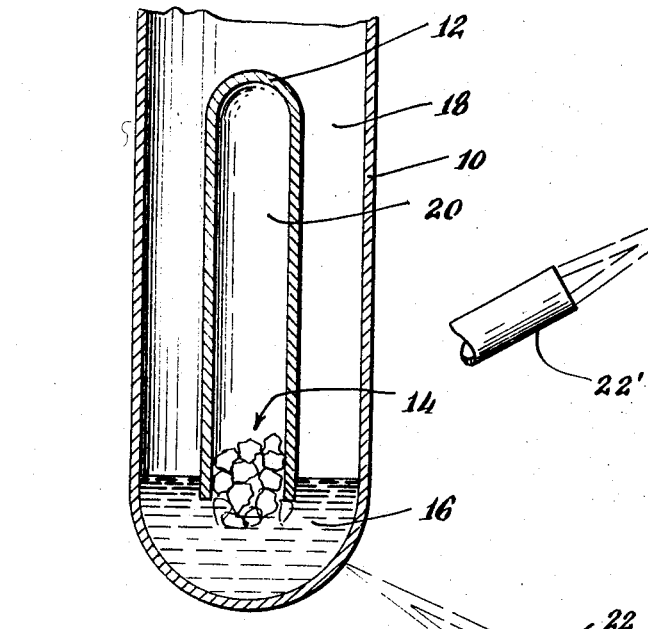
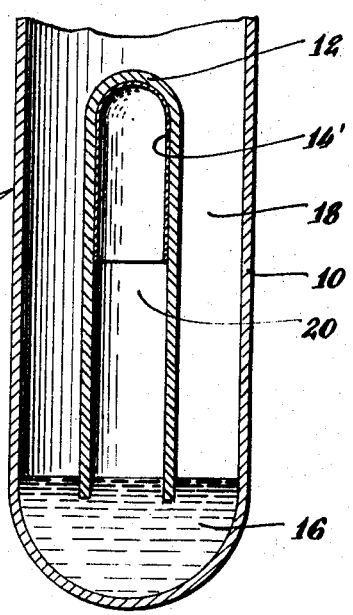
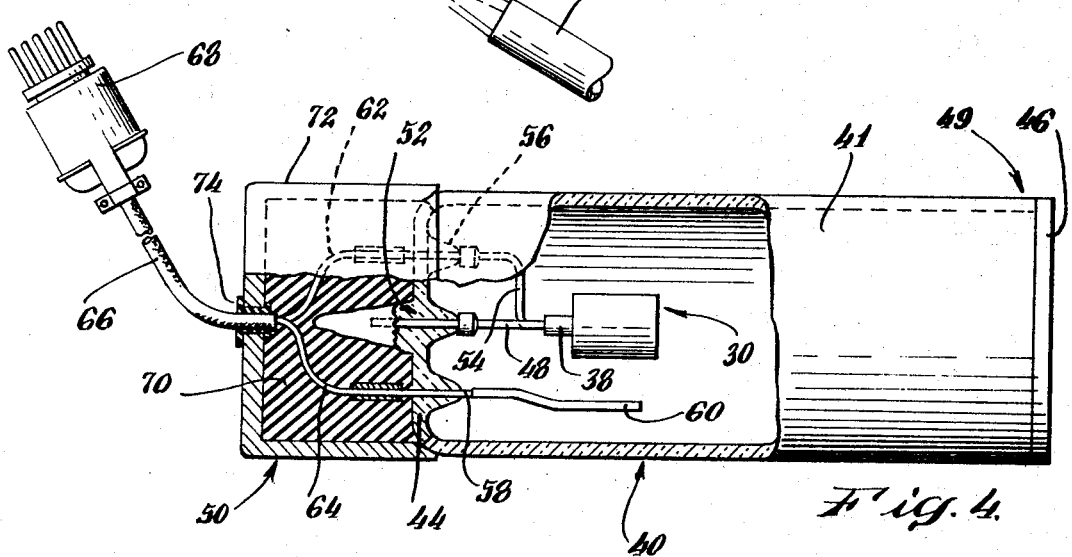
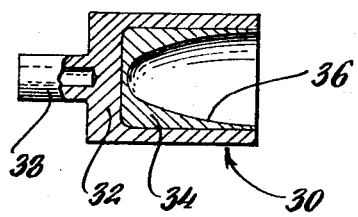
INVENTORS.
Carl R. Sebens
BY John Vollmer
ATTORNEY.

United States Patent Office 3,412,278
Patented Nov. 19, 1968

3,412,278
HOLLOW CATHODES HAVING A MATRIX MATERIAL WITH PARTICLES INTERSPERSED
Carl R. Sebens, Stratford, and John W. Vollmer, Norwalk, Conn., assignors to The Perkin-Elmer Corporation, Norwalk, Conn., a corporation of New York
Filed Dec. 1, 1965, Ser. No. 510,754
11 Claims. (Cl. 313—346)

This invention relates to a new method of producing hollow cathodes used in radiation (light) sources especially useful in spectroscopic analyzers of the atomic absorption type. The invention also relates to the hollow cathode lamp as made by the inventive method.

In atomic absorption spectroscopy the sample is analyzed by determining the absorption (at certain specific wavelengths of radiation) caused by the atoms for which the analytical test is being made. This technique is particularly useful for analyzing (both qualitatively and quantitatively) a sample containing one or more metallic ions. Usually the metallic sample is converted into a salt (if necessary), then is dissolved in a liquid solvent (such as water), and is then vaporized in the flame of a burner, so that the sample is atomized. The atomized sample is then irradiated with a light source, which is of great intensity at least at one characteristic absorption band of the metal for which the test is being made. Only irradiation at this characteristic wavelength which is passed through the sample is then allowed to affect a detector, which therefore yields a measurement of how much absorption has occurred. The detected intensity (as compared to the original source intensity, for example) therefore yields a quantitative measurement of the concentration of the particular metal for which the analysis is being conducted.

In order to irradiate the sample at high intensity in the narrow absorption band, the light source itself preferably includes a relatively high concentration of the metal for which the test is being made. At the present time the typical such light source is the hollow cathode lamp, in which a cup-shaped element (including at least a substantial percentage of the metal for which the test is intended) acts as the negative electrode of the lamp. Both this hollow cathode and the positive electrode are hermetically sealed within a glass envelope in a low pressure atmosphere of an inert (noble) gas.

Ideally a hollow cathode should produce the desired spectral band at high intensity, without substantial intensity fluctuations with time, and have a long useful life. Thus, the cathode material must be able to withstand the relatively high temperatures necessarily developed when electrical currents are passed therethrough (as is necessary to develop the high intensity radiation). In particular the cathode material should not unduly boil, sublime, sputter, decompose or change its relative composition (i.e., the various constituents should maintain substantially the same proportions before and after a reasonable period of use). Ideally the cathode material should also be capable of being formed into the desired cup shape relatively readily.

For those metals intrinsically having the desired properties (such as: a melting point above, say, about 500° C., moderate vapor pressure in the neighborhood of this temperature, good machinability and other mechanical characteristics, and the like), the hollow cathode may be composed of the pure metal desired (such as copper, silver, and many other metals having the above-mentioned properties). When the material desired to be incorporated in the hollow cathode lacks one or more of the desired properties, other techniques must be utilized to obtain a satisfactory cathode including these materials. One possible technique is the utilization of the desired metal in the form of a mixture or alloy (both terms being used in their broadest sense) with one or more other metals or other materials. However, such techniques often fall short of solving all of the problems. In particular if the desired metal is only loosely associated with other metals in a mixture, its melting point and even more importantly, its vapor pressure is not affected (although the melting point of the entire cathode may be quite different from the pure metal). If the vapor pressure of the desired metal is too high, it may be lost from the surface of the cathode, so that the cathode soon becomes quite inefficient in emitting the very line spectra for which it is used. On the other hand if a strongly bound alloy (i.e., an intermetallic compound) is formed, the emission lines of the pure metal desired may be weakened or even substantially eliminated from the emission spectrum of the cathode. In addition any useful mixture or alloy must be reasonably stable through the temperature range from room temperature (about 20° C.) through the operating temperatures (up to about 600° C.).

Because both strongly bound alloys (i.e., intermetallic compounds) and loose associations (including gross mixtures), have intrinsic disadvantages, the invention utilizes a technique which is not often utilized in the metallurgical arts and is believed to be entirely novel in the atomic absorption hollow cathode lamp art. In particular the technique utilized in the invention is that of precipitating the desired metal as fine grains or small crystals throughout the entire hollow cathode material (which typically comprises besides the desired metal one or more additional metals). In particular the disclosed specific embodiment teaches how to fabricate a hollow cathode, which is useful in the light source for atomic absorption spectroscopic analysis for arsenic, by forming small, finely dispersed particles of arsenic in a matrix of lead and gold.

An object of the invention is therefore provision of a new technique for fabricating hollow cathodes useful in atomic absorption spectroscopy, to provide such cathodes containing metals for which analysis is desired, for those metals which have physical properties somewhat inconsistent with the desirable physical properties of a hollow cathode material.

Another object is the provision of hollow cathodes for atomic absorption spectroscopy, containing at least one metal having physical properties which would normally cause difficulty in incorporating it in a stable manner in hollow cathodes.

A more specific object of the invention is the provision of a hollow cathode suitable for the atomic absorption spectroscopic analysis of arsenic.

Other objects and advantages of the invention will become obvious to one skilled in the art upon reading the preceding introduction and the following detailed description in conjunction with the accompanying drawing, in which:

FIGURE 1 is a somewhat schematic representation of one of the steps in fabricating the material which is formed into a hollow cathode;

FIGURE 2 is a somewhat schematic illustration of a subsequent step in the same process;

FIGURE 3 is a cross sectional enlarged view of a hollow cathode lamp made by the process of the invention; and FIGURE 4 is a side elevational view of a finished atomic absorption lamp incorporating a hollow cathode of the invention.

For the purposes of illustration and in order to conform to the patent statutes, a specific example of how an arsenic-containing hollow cathode may be fabricated is given immediately hereinbelow. It will of course be obvious to those skilled in the art that the following is merely one example of the inventive concept. Specifically, not only may different operating conditions (such as temperature) be used and different proportions of the various constituent metals, but even entirely different metals may be used to prepare hollow cathodes of different composition. Therefore, the following specific example is only one preferred embodiment of the invention, as will appear subsequently.

Quantities of pure arsenic, lead and gold are first weighed out in the proportion of ten percent arsenic, twenty-seven percent lead and sixty-three percent gold. For making a single hollow cathode weighing two grams, 0.20 gram of arsenic, 0.54 gram of lead and 1.26 grams of gold may be used, but it is preferable to use enough material for several (say, four or five) cathodes at one time. The arsenic should be broken into small pieces having dimensions of approximately one-eighth of an inch. The metals and all the apparatus used must be kept clean and dust-free. The arsenic should be kept under an inert gas such as argon except during the actual weighing. The gold and lead are put into the bottom of an alloy preparation tube 10 of suitable size (see FIGURE 1); and the small pieces of arsenic are placed in a smaller quartz tube 12. Both tubes 10 and 12 have been previously cleaned and dried (for example, by firing in a clean atmosphere) and are maintained dust free. The small quartz tube is then introduced into the larger alloy preparation tube 10 in a relatively inverted manner, so as to finally assume the position schematically illustrated in FIGURE 1. In this figure the granules of arsenic are shown at 14 inside the inverted quartz tube 12, while the lead and gold are at the bottom of the larger upright tube 10 in the area indicated at 16. When assembling the apparatus in the manner generally shown in FIGURE 1, care should be taken that the arsenic granules at 14 stay within the small quartz tube 12 as shown.

FIGURE 1 actually shows the next step in the manufacturing process, which comprises heating and lead and gold mixture in the bottom of the alloy tube 10 so as to form a melt (indicated at 16). Before heating the material in the manner indicated in this figure, argon gas is caused to flow through the alloy preparation tube 10 at a moderate rate (for example, five cubic feet per hour). Therefore, before heating is undertaken the space 18 in the upper part of the alloy tube 10 will consist essentially of pure argon and most of the air inside the small quartz tube 12 will also preferably have been replaced by pure argon, as indicated at 20.

In the heating step indicated in FIGURE 1, the torch 22 or other heating means is applied near the bottom of the alloy preparation tube 10 so as to heat the mixture of lead and gold at 16 to make it molten. If the specific weight ratio of lead and gold suggested above (namely, 0.54 gram and 1.26 grams, respectively) are utilized so that the weight percentage of lead will be 30 percent and the gold 70 percent, the mixture will be entirely liquid at temperatures above about 630° C. (see, for example, the Hansen book, Constitution of Binary Alloys, p. 223 at FIGURE 129). Ideally the temperature of the lead and gold should not be raised much above 630° C. Since at atmospheric pressure arsenic sublimes at 616° C., the arsenic granules 14 will vaporize, but will recondense along the inside of the upper part of quartz tube 12 (which upper part is below 616° C.).

The temperature of the melt of the lead and gold at 16 is then maintained at a reduced temperature somewhat below 616° C. while heat is applied to the upper part of the quartz tube 12. This heat may be applied by torch 22' or another heating means applied at the location indicated in FIG. 2. The preferred temperature (just mentioned) of the molten lead and gold mixture during this operation corresponds to a barely visible red heat. As the torch 22' heats the arsenic deposited along the walls of the upper part of tube 12, the arsenic will resublime. Because of the pressure developed by the trapped arsenic vapor, it will force its way down into the melt 16 and bubble therethrough. The small quartz tube 12 is heated until essentially all of the arsenic has bubbled into the molten alloy at 16. As the arsenic enters the mixture of lead and gold, the liquidus (i.e., the temperature above which everything is liquid) drops somewhat from about 630° (for the particular lead-gold mixture) to a somewhat lower temperature. Thus, at a constant temperature of, say, 600° C., the lead-gold mixture is somewhat slushy, having a liquidus of about 630° C. and a solidus of 418° C. (the latter being the temperature at which such mixture becomes totally solid). When the arsenic is added, the mixture of all three metals has a somewhat lower liquidus, so that at, say, 600° C., the mixture appears to be more or less a complete liquid.

The torch 22' is then removed or lowered to the position as shown at 22 in FIGURE 1, while maintaining the heat at the lower end of tube 10 at a temperature of about 500–600° C. As the small tube cools, the pressure therein will be reduced, so that the alloy will be sucked up into this tube. When all of the alloy is contained in the small tube 12, the heat is removed and the entire apparatus allowed to cool to about room temperature, the argon flow being maintained during this entire process. The small quartz tube may then be removed from the alloy preparation tube 10, and the quartz tube 12 carefully cracked away from the alloy slug.

An alternative procedure, having a minor additional step at the very beginning of the alloy prepartion stage is useful especially when the gold (or lead or both) are originally in the form of relatively coarse lumps. The gold and lead mixture may be first preheated and melted in tube 10 before the small quartz tube 12 is introduced. After some cooling, the small tube 12 containing the arsenic may then be placed into the larger alloy preparation tube 10 in the inverted manner shown in FIGURE 1. The rest of the procedure is then the same as previously described, FIGURE 1 then showing the next step (which now represents a reheating of the previously melted and cooled gold-lead mixture). The additional preheating step avoids the possibility of loss of the arsenic from the inverted small tube 12 by its falling between large crevices in the original lumps of gold (and/or lead) in the early steps, which may occur when coarse lumps of the latter are used in the method previously described. In this slightly modified version, including the preheating step, any large crevices in the lumps of gold (or lead) are obviously eliminated before the inverted small tube 12 and its contained arsenic are introduced into larger preparation tube 10.

One conventional size hollow cathode may be made from each approximately two-gram portion of this alloy slug. When a moderate number of hollow cathode lamps are being manufactured, one can conveniently make enough alloy for, say, four hollow cathodes by using 0.80 gram of arsenic, 2.16 grams of lead, and 5.04 grams of gold. Once the final alloy has been prepared and cut into two-gram portions, the hollow cathode is prepared therefrom as follows.

A cleaned iron cathode; having a generally cup-shaped cathode surface, is placed on the central axis of a centrifuge with the two-gram slug of the alloy in its center. The iron cathode or holder and the alloy slug are then covered with a quartz tube, and argon gas is flowed over the cathode at about five to ten cubic feet per hour. The entire assembly of iron cathoed, alloy slug and the quartz cover are then rotated at a very slow speed, as heat is applied with a torch or other means. The heat is continued until the alloy just barely melts, overheating being carefully avoided. When the alloy slug has become sufficiently fluid, the spinning speed is increased until the alloy climbs up to the lip of the iron holder. The spinning is maintained until the alloy cools sufficiently to completely reharden (the heating having been discontinued). The argon gas flow is maintained while the newly formed alloy cathode cools. After the assembly has reached a temperature not much above room temperature, the quartz cover tube is removed, and the newly formed cathode assembly is placed in a clean, argon-filled jar until the final manufacturing steps of placing the cathode in the lamp are to be done.

FIGURE 3 shows a finished hollow cathode assembly 30, in which the iron cathode holder 32 has bonded to its interior emitting surface the alloy 34. The interior surface 36 of the alloy will conform essentially to a paraboloid, due to the spinning described immediately above. Although it is primarily this surface 36 which is the active part of the hollow cathode in use, it should be noted that because of the even dispersion of the tiny crystals of arsenic throughout alloy 34, loss of the surface material at 36 will cause only moderate change in the composition of the active surface of the alloy, so that the hollow cathode maintains relatively good performance even after extensive use.

FIGURE 4 shows a completed hollow cathode lamp, particularly adapted for use as the light source for an atomic absorption instrument (although not limited to such purpose). In FIGURE 4 the hollow cathode assembly 30 is shown as attached, as by crimping of its supporting portion 38 (compare FIGURE 3) to a metallic pin of the lamp assembly, which not only provides mechanical support but also the electrical connection to the hollow cathode 30. Although the hollow cathode lamp 40 shown in FIGURE 4 may be assembled in a conventional manner, a brief description of the way in which it is manufactured is hereinafter given for purposes of completeness. In the following description the various elements will be referred to by the reference numerals shown in FIGURE 4, even though the following assumes that the elements are originally not yet fully assembled.

The other elements of the lamp, namely, a stem assembly and the envelope tube, are assembled on a glass lathe.

The open (left-hand) end 41 of the hollow lamp tube 42 is plugged temporarily (e.g., with an aluminum foil-covered stopper) and the whole assembly 40 flushed with argon. The stem assembly 44 is then sealed to the tube 42 (with the argon gas flow at about five to ten cubic feet per hour) and carefully annealed. The assembled stem and tube assembly and the window 46 to be used for the final lamp are then baked in a vacuum oven (after allowing warm up). After partial cooling, the oven is back-filled with highly purified nitrogen. When the assembly is essentially at room temperature, the hollow cathode is passed into the tube 42 so that the hole 39 (see FIG. 3) of the support portion 38 of the hollow cathode is positioned on center pin 48 of the stem assembly 44. The support portion 38 of the arsenic cathode 30 is then crimped to the center pin 48, thus anchoring it to the stem and tube assembly (44, 42). The window 46 is then cemented on the assembled tube with epoxy at 49, which is then cured (for example, for two hours at between 160° F. and 180° F.). During this epoxy curing, the lamp is flushed with highly purified nitrogen (at two to four cubic feet per hour) continuously by means of a glass connection tube (not shown) through the stem 44. After cooling this connection tube is plugged with a rubber stopper, and a leak check is performed with helium gas. No detectable leak (even with helium) should occur. The almost completed lamp is refilled with argon and replugged with a rubber stopper. The lamp is then evacuated to a measured vacuum having a pressure no higher than $1 \times 10^{-6}$ millimeter of mercury, and baked after allowing a warm-up period. After this degassing step the lamp is ready to be run in and finally sealed.

The run-in consists of operating the lamp with a low argon pressure inside the lamp, with evacuation steps (the vacuum being at least as good as $10^{-6}$ mm.) between each run. After each run the lamp is allowed to cool, is then evacuated, and is then refilled with fresh argon; and the next run of the run-in schedule performed. Following the last of such run-in periods the connection tube of the stem part of the lamp is cut off (i.e., the lamp is sealed), and the sealed lamp then run for an additional period. The voltage drop across the lamp should preferably be measured near the end of each of these runs so as to yield data for the individual lamp, which will be useful to the user and also forms a basis for quality control.

As may be seen in FIGURE 4, the final lamp normally has an essentially conventional base 50 of insulating material cemented (as at 52) to the stem assembly 44 (which has already been joined to the left-hand end of the tube 42). In the particular lamp shown, the center pin 48 is electrically connected at 54 to a different one 56 of the three pins (48, 56, 58) of the stem assembly. Lower pin 58 carries the slightly bent rod-like anode 60. The left-hand ends of pins 56 and 58 are connected to electrical leads 62, 64, respectively which may be brought out of base 50 as a single insulated cable 66, terminating in electrical plug connector 68. Base 50 may consist of an insulating filler 70 (in which leads 62 and 64 are embedded in a slack manner), an outer hard casing 72, and a strain relief 74 (for holding the cable 66 in place). The lamp as shown in FIGURE 4 is ready for use, e.g., as a light source for atomic absorption spectroscopy.

Although the hollow cathode alloy in the above example contains only ten percent (or less due to some loss of arsenic vapor in manufacturing) arsenic (by weight), it nevertheless is a quite efficient lamp for use in arsenic analysis by the atomic absorption technique. This is apparently due to the fact that the arsenic is well scattered throughout the alloy in the form of very small crystals, so that the surface always contains a reasonable amount of these crystals, which have a relatively large surface area. As may be seen from p. 154 and p. 173 of the above cited Hansen reference book, arsenic has extremely low solid solubility in both gold and lead over the entire range of temperatures from room temperature to the normal operating temperatures of the hollow cathode lamp (say about 400° C.). Because of the low solubility of arsenic in the gold-lead alloy, the arsenic tends to be retained in the alloy as such tiny crystals and is gradually uncovered as the alloy is sputtered away in use. Therefore, the arsenic is fed slowly into the glow of the hollow cathode tube. There is a tendency for the surface of the cathode to become less rich in arsenic as the lamp is used. For this reason it is necessary to increase the operating current somewhat as the hollow cathode lamp ages. This appears to be caused by the sublimation of arsenic from the operative (i.e., cup part) of the cathode to inoperative parts thereof (i.e., the outside or cylindrical parts) with use. The greater currents cause additional sputtering of the gold and lead so as to uncover fresh arsenic crystals.

It may be seen that the above example accomplishes the desired result of obtaining a practical, readily manufactured, and relatively long life hollow cathode for use in an atomic absorption lamp. Although the single specific example fully described hereinbefore gives the preferred weight ratio of the three components constituting the specific alloy, some variation in the percentage of each constituent is of course possible. The amount of arsenic should be at least approximately 3% in order to give sufficient arsenic band emission in the final cathode; the weight percent of arsenic may go as high as about 20% before the mechanical properties of the alloy are seriously adversely affected. Although the given preferred total weight percentages of lead (27%) and gold (63%) yields a lead-gold alloy (constituting 70% gold and 30% lead by weight) having a convenient melting point, it is possible to use substantially less lead (which increases the melting point of the alloy) or even no lead at all; somewhat more lead (which has the opposite effect) may also be used. Specifically the lead may be as little as 0% and as much as 50% by weight (as referred to the total of all three constituents), and the gold may be as little as 30% to as much as 97% of this same total weight. The arsenic would be between 3 and 20% by weight of the total.

Increasing the amount of arsenic has the tendency of causing the arsenic crystals to be too large; increasing the amount of lead reduces the melting point of the entire cathode to temperatures below the optimum operating temperature, thereby limiting the total amount of current which may be passed therethrough and therefore the brightness of the lamp; and increasing the amount of gold excessively tends to raise the melting temperature (i.e., liquidus) of the lead-gold alloy to an inconveniently high temperature (well above the subliming temperature of pure arsenic) for the manufacturing process. Excessively reducing the amount of arsenic has the previously mentioned consequence of limiting the amount of arsenic line emission; reducing the amount of lead too much has the effect of raising the temperature at which the lead-gold alloy becomes totally liquid, thus complicating manufacture; and reducing the amount of gold has the general effect of lowering the melting point of the lead-gold alloy and of the entire finished cathode below the optimum forming temperature and operating temperature, respectively.

Particularly because of the just noted ranges of constituent percentages and the accompanying effects, it will be obvious to one skilled in the art how some variation not only from the specific example but even from the preferred ranges mentioned may actually be advantageous or even necessary under some conditions. The invention therefore is clearly not limited to the specific example hereinbefore fully described or even to any narrow range of constituents, but rather is defined by the scope of the appended claims.

What is claimed is:
1. The method of producing a hollow cathode for a radiation source useful in atomic absorption spectroscopy from a plurality of metallic components, at least a first of which will emit spectral bands of substantial brightness, comprining:
   mixing said metallic components in such proportions and under such conditions that all said metallic components are initially intimately intermingled so as to form an initial alloy in which the various metallic components are of substantially atomic size;
   changing the conditions to which said alloy is subjected so as to cause at least said first metallic component to separate out as relatively small grains within the remaining mixture, said grains being of substantially larger than atomic size;
   and forming at least a substantial part of the emitting portion of a hollow cathode from said mixture now containing said first component as scattered grains.
2. The method according to claim 1, in which:
said first metallic component is arsenic.
3. The method according to claim 2 in which:
said metallic components in addition to said arsenic comprise a substantial quantity of gold.
4. The method according to claim 3 in which:
said metallic components in the original mixture are within the following percent ranges by weight:
   arsenic, 3% to 20%, and gold 30% to 97%.
5. The method according to claim 1 in which:
said first metallic component constitutes arsenic;
and the remaining components comprise a mixture of lead and gold.
6. The method according to claim 5, in which said metallic components in the original mixture are within the following percent ranges by weight:
   arsenic, 3% to 20%, gold 30% to 92%, and lead 5% to 50%.
7. A hollow cathode for a radiation source comprising:
a generally cup-shaped hollow cathode, at least a substantial part of the interior emitting portion of which comprises a metallic mixture;
said mixture comprising a first metallic component in the form of small precipitated grains;
said small grains being scattered substantially throughout said mixture;
the original surface layer of said interior emitting portion therefore including such small grains of said first metallic component, and additional such small grains being uncovered as said emitting portion sputters away,
whereby said hollow cathode initially emits radiation corresponding to said first metallic component, and will continue to emit such radiation even after substantial use.
8. A hollow cathode according to claim 7, in which:
said first metallic component is arsenic.
9. A hollow cathode according to claim 8, in which:
said metallic mixture, in addition to said arsenic comprises a substantial quantity of gold.
10. A hollow cathode according to claim 8, in which:
said metallic mixture, in addition to arsenic, comprises substantial quantities of gold and lead.
11. A hollow cathode according to claim 7, in which:
said first metallic component grains are substantially pure arsenic,
and said entire mixture including said arsenic grains comprises the following metals in percent by weight of the entire mixture:
   arsenic, 3% to 20%; gold 30% to 97%; and lead 0% to 50%.

References Cited
UNITED STATES PATENTS

| | | | |
|---|---|---|---|
| 2,840,751 | 6/1958 | Meisters et al. | 313—346 X |
| 2,847,605 | 8/1958 | Byer | 313—346 X |

JAMES W. LAWRENCE, *Primary Examiner.*

C. R. CAMPBELL, *Assistant Examiner.*